United States Patent [19]
Shaffer

[11] 4,213,796
[45] Jul. 22, 1980

[54] MOBILE CLEANING UNIT
[75] Inventor: Detmer B. Shaffer, Garrettsville, Ohio
[73] Assignee: Sparkle Wash, Inc., Chagrin Falls, Ohio
[21] Appl. No.: 882,167
[22] Filed: Mar. 1, 1978
[51] Int. Cl.² .............................................. B08B 3/02
[52] U.S. Cl. ........................................ 134/26; 134/95; 239/172; 137/112; 134/36; 137/624.18; 137/351
[58] Field of Search ................ 137/112, 624.18, 624.2, 137/604, 607, 351; 134/95, 57 R, 26, 36; 239/130, 172

[56] References Cited
U.S. PATENT DOCUMENTS

| | | | |
|---|---|---|---|
| 2,506,394 | 5/1950 | Strange | 137/112 X |
| 3,163,882 | 1/1965 | Johnson | 239/130 X |
| 3,322,350 | 5/1967 | Heinicke | 239/172 |
| 3,447,505 | 6/1969 | Wagner | 137/604 UX |
| 3,454,030 | 7/1969 | Nelson | 137/112 |
| 3,481,544 | 12/1969 | Jackson | 239/130 |
| 3,567,342 | 3/1971 | Jackson | 417/234 |

Primary Examiner—Alan Cohan
Attorney, Agent, or Firm—Watts, Hoffmann, Fisher & Heinke

[57] ABSTRACT

A mobile cleaning unit for providing a high pressure cleaning spray, comprising a van-type vehicle with separate sources of water and cleaning and treating solutions. Valves, one associated with each source, determine the composition of the cleaning spray by individually controlling both the introduction and the proportion of cleaning or treating solution introduced into the water as it is used in cleaning. The individual valves are successively operated in response to each initiation of flow from the source of water. The cleaning or treating solution from a particular source to be used is selected by starting and stopping flow from the source of water by operation of a flow control valve at the spray applicator.

5 Claims, 4 Drawing Figures

MOBILE CLEANING UNIT

BACKGROUND AND SUMMARY

This invention relates to a mobile cleaning and treating unit and more particularly to a unit for high pressure spray application in the cleaning and treating of large structures, such as mobile homes, trucks, automobiles, buildings, and the like. Through a novel control system and valving arrangement different cleaning and treating agents can be introduced to the spray.

Mobile units suitable for on-site cleaning and treating operations are shown in U.S. Pat. Nos. 3,481,544 and 3,567,342, granted to Otto V. Jackson and assigned to the assignee of this application. These units are compact and self-contained, each carrying its own water, cleaning and treating compounds, and the like, as well as power to produce a high pressure spray even with long hose lengths that are often necessary when large structures are being cleaned. Cleaning with units of this type is more efficient than using existing on-site water pressure; in particular, relatively high pressures are attainable with positive displacement pumps carried by the mobile unit, the water can be heated, and correct proportions of various cleaning or treating agents can be conveniently added during application. A relatively compact mobile van houses and carries washing equipment, which is fixed within the van, except for one or more spray hoses with remote applicators and control valves. The pumps that provide the high pressure spray are driven from motors operated from electricity generated from a power unit in the truck. Unloader valves are provided with the positive displacement pumps to permit operation of the pumps while the spray outlet is turned off. This affords flexibility of operation without overloading the pumps and driving motors. In such vans, provision has been made for mixing liquid cleaner with water as the water is drawn from a storage tank carried by the truck and supplied to the hose and applicator by the pumps. In the units disclosed in the aforementioned patents, this was accomplished by opening a solenoid-operated valve to allow introduction of detergent or the like to the pump. Pump controls would determine the amount of detergent introduced. The solenoid valve was opened by a switch on a cord to a control box for the valve so that detergent could be added by the operator at the spray nozzle remote from the truck. While such an arrangement functioned satisfactorily, it had the disadvantages of introducing only one chemical unless the operator returned to the mobile unit to change the contents of the container of liquid cleaner, and it required a separate control and cord to be carried by the operator to selectively introduce the detergent, which was difficult to keep untangled and created an electrical hazard. In a subsequent construction plural sources of chemicals were provided with valves operated by remote radio control. However, the chemicals from the different sources were supplied in the same ratio or the operator was required to return to the mobile unit to adjust the inlet control to the pump from the supplies to change the ratio, negating the advantage of remote selection. Further, the radio control was not suited for use in the environment and suffered breakage or water damage. Often the batteries of the portable transmitter would go dead, the transmitter frequency was often misaligned, the operator would sometimes leave without the transmitter, and stray radio signals would operate the valves.

The present invention provides a control system for introducing individually adjustable proportional amounts of liquid additives from a number of separate containers to a pressurized flow of liquid being applied to a structure, such as a building, vehicle, or the like, without separate controls for selection, but rather utilizing the flow control valve for the applicator spray. In a preferred embodiment, the pressurized flow is provided from a tank of water, by a motor driven pump associated with a main conduit for supplying water to an outlet. A flexible hose with a trigger-operated flow-control valve and applicator nozzle is attached to the outlet and used for applying the fluid to the structure being cleaned or treated.

A plurality of containers, four in the preferred embodiment, contain cleaning and treating chemicals. Each container communicates with a common conduit through an electrically operable control valve that has a mechanical adjustment for throttling passage of fluid that flows from the container through the valve to the main conduit. A switch-operated sequence control electrically operates the control valves, each separately in succession, in response to the initiation of flow in the main conduit. The sequence control also includes a condition in the sequence in which no electrically operable control valve is opened. Thus, each time the flow of liquid is initiated from the flow control valve of the applicator, a different one or none of the control valves of the separate containers is opened to introduce fluid from a particular container or to prevent introduction from any container to the main flow. Preferably, the containers are filled with appropriate chemicals so the sequence of operation of the valves corresponds with the normal sequence of use of the chemicals in a cleaning or treating operation. This is not necessary, however, because by momentarily triggering a flow of fluid, a successive valve may be opened and the operator can thereby conveniently progress to any desired chemical or to a condition where none of the valves is opened and only the flow of fluid from the main tank is provided.

Advantageously, the control valves from each of the containers is a solenoid controlled diaphragm valve that incorporates a needle valve control for adjusting the flow of chemical through the valve. Each valve is connected to a common conduit that then connects to the main conduit through a venturi so that flow through the main conduit draws fluid in desired proportion from the appropriate container through one of the opened solenoid-operated valves and the common conduit.

With the present invention it is possible for the operator to remotely and conveniently control the selection of additives in proper proportions to his primary liquid supply without leaving his position at the applicator and without the need for a separate electrical cable and switch or radio controlled system.

DETAILED DESCRIPTION OF A PREFERRED EMBODIMENT

Figure 1:
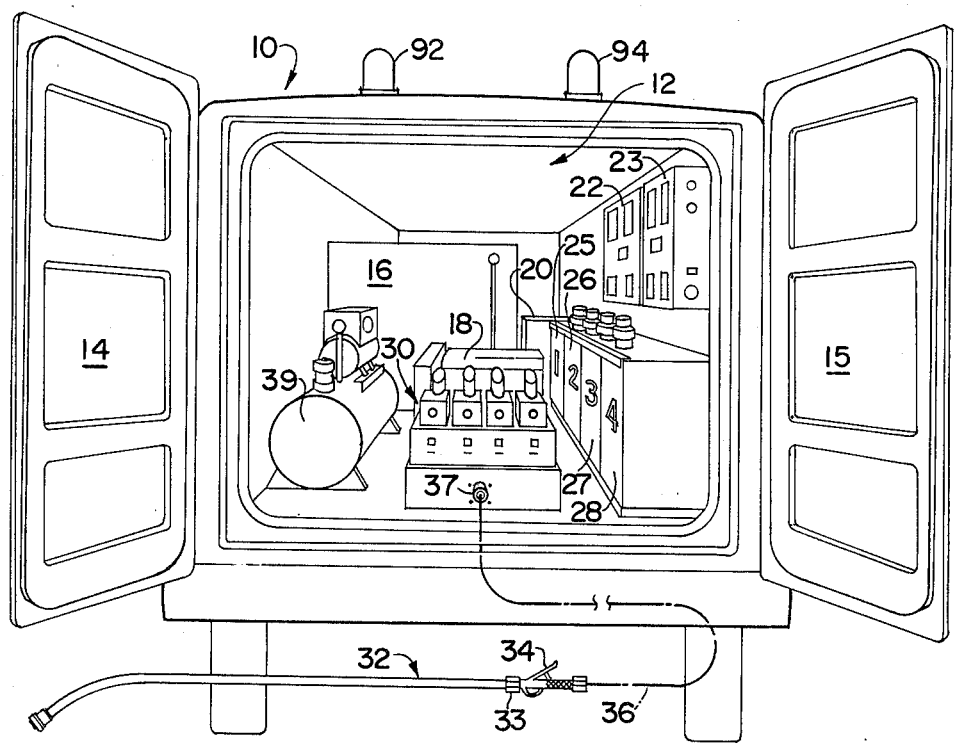
FIG. 1 is a perspective view of a van incorporating the present invention, illustrating the general arrangement of the parts.

Referring now to the drawings, a mobile cleaning unit embodying the present invention is indicated generally by the reference numeral 10. The mobile cleaning unit 10 includes a van-type motor vehicle 11 with a load-carrying portion 12 having two rear doors 14, 15, shown open in FIG. 1. The portion 12 contains a fluid-carrying tank 16, a pump and motor unit 18, a motor generator unit 20, control panels 22, 23, four containers 25, 26, 27, 28 for chemicals to be mixed with fluid from the tank 16, a control unit 30 for introducing the chemicals to the flow from the tank, and a spray gun 32 with a control valve 33 operated by a trigger 34 connected by a hose 36 to an outlet 37 of a main conduit 38 (FIG. 4) from the tank 16. Also shown is a compressor and tank unit 39 for solvent or acids. The construction of the tank 16, the pump and motor unit 18, control panels 22, 23, motor generator 20, and van portion 12 are disclosed in more detail in the aforementioned U.S. Pat. No. 3,567,342, the disclosure of which is hereby incorporated herein by reference.

Figure 4:
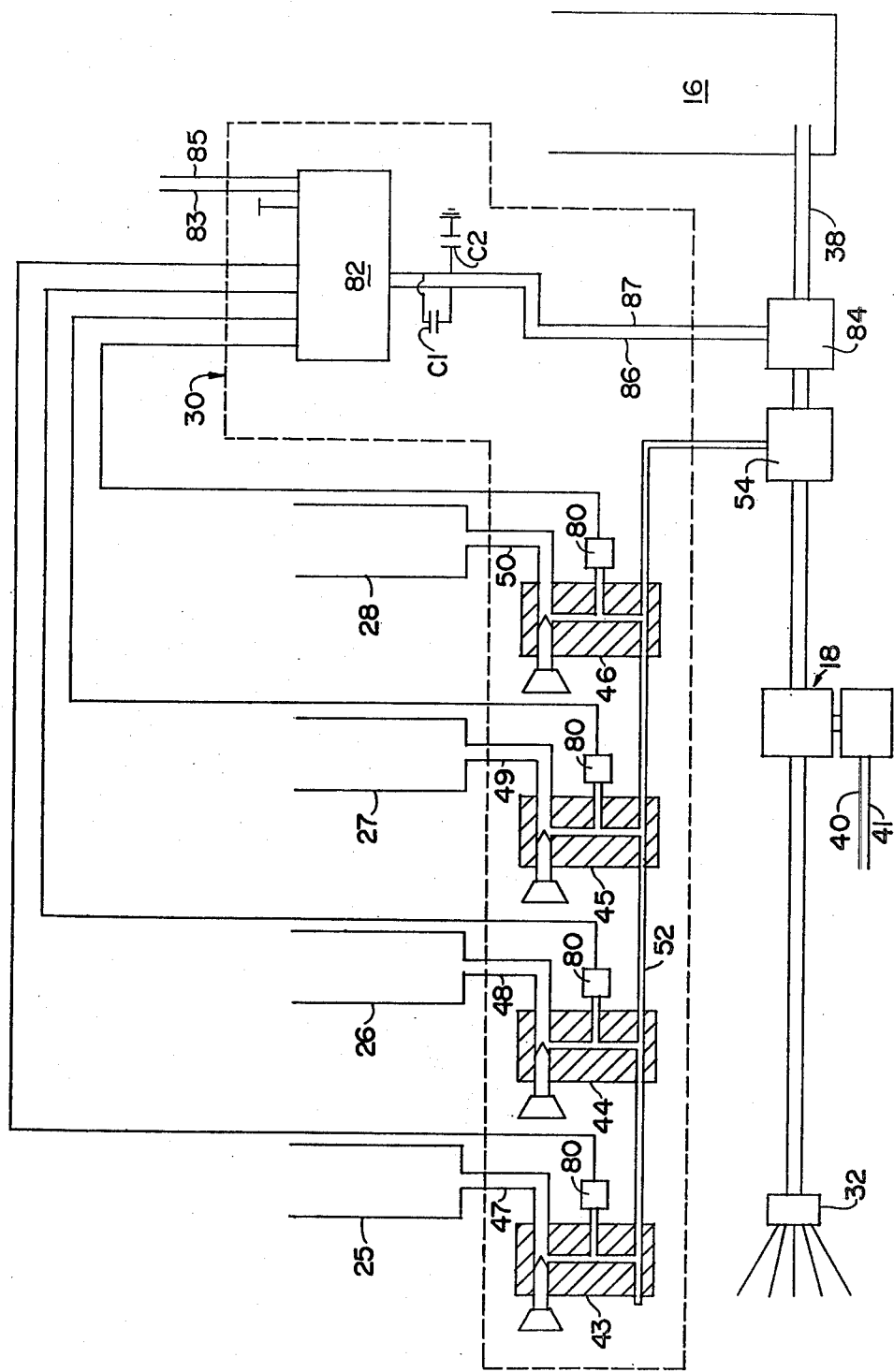
FIG. 4 is a diagrammatic view of a system embodying the present invention for selectively introducing controlled amounts of chemicals to a flow of fluid for cleaning and treating purposes.

As shown diagrammatically in FIG. 4, the main conduit 38 extends from the tank 16 to the pump and motor unit 18 and thence to the trigger-operated spray gun 32. The motor of the pump and motor unit 18 is an electric motor supplied with power through leads 40, 41 from the motor generator unit 20.

The control unit 30 includes four valves 43, 44, 45, 46 that communicate between the four containers 25, 26, 27, 28, respectively, via respective conduits 47, 48, 49, 50 and a common conduit 52 that leads to the throat of a venturi injector 54 in the main conduit 38.

Figure 2:
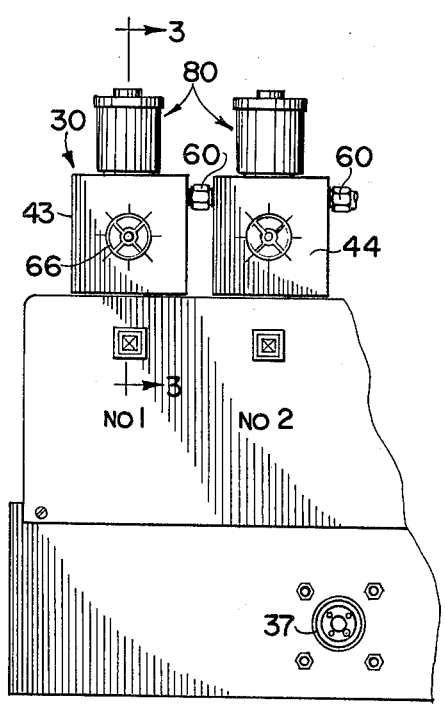
FIG. 2 is a partial front elevational view of supporting structure and control valves that communicate with containers for introducing chemicals to a flow of fluid.
Figure 3:
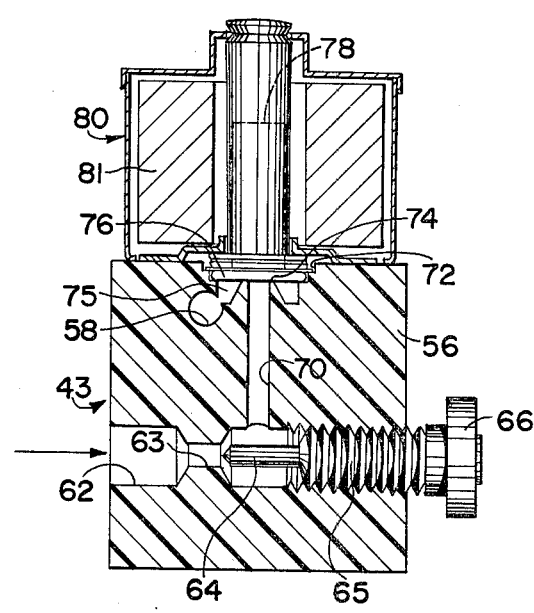
FIG. 3 is a transverse sectional view of a solenoid-operated control valve constructed in accordance with the present invention.

The valves 43-46 are identical in construction and are shown structurally in FIGS. 2 and 3. Each is comprised of a body portion 56, preferably plastic, that has a transverse passage 58, horizontal in the embodiment shown, which when connected by a coupling 60 to the transverse passage of an adjacent body portion 56, forms the common conduit 52 opening to all of the valves 43-46. An inlet passage 62 is provided in the body portion 56, at the back of the body in the orientation of FIGS. 1 and 2, and extends into the body at right angles to the transverse passage 58 but displaced therefrom so as not to intersect the passage. The inlet passage 62 is throttled at 63 and the throttling opening is controlled by an adjustable needle 64 on a threaded shaft 65 that extends from the body portion 56 of the valve and to which is attached a hand knob 66. Rotation of the hand knob adjusts the needle longitudinally of the inlet passage 62 and relative to the throttling portion 63 to control the rate of flow of fluid through the inlet passage for any given pressure differential on opposite sides of the throttling portion 63.

An internal passage 70 extends vertically in the orientation shown, from the inlet passage 63, on the downstream side of the throttling portion 63, to an opening 72 in the wall of the body portion 56. The opening 72 is constructed to provide a valve seat 74 that surrounds the end of the internal passage 70 that joins the opening 72. The opening is also constructed with an annular recess 75 to communicate with the transverse passage 58 that in part forms the common conduit 52.

A diaphragm valve 76 cooperates with the valve seat 74 to prevent communication between the internal passage 70 and the transverse passage 58 when it is against the seat 74. The diaphragm valve 76 is spring biased to a position in which it normally closes the internal passage 70 and is movable away from the valve seat by a plunger 78 of a solenoid 80 when electrical current is supplied to a coil 81 of the solenoid surrounding the plunger.

As shown in FIG. 4, each solenoid 80 is electrically operated from electrical energy directed by a control switching means 82 supplied with power from leads 83, 85. Suitably, the control switching means is a relay operated stepping switch (not shown) by which each energization of a latching relay advances a cam that closes in sequence one of a number of sets of contacts (in the present case, four) associated with each solenoid to energize the solenoid coil. The latching relay (not shown) is operated by electrical energy from a normally open flow switch 84 operated from the main conduit 38 and electrically connected with the switching means 82 by leads 86, 87. The flow switch is closed each time fluid flow is initiated from the tank 16 through the conduit 38. Accordingly, by operating the trigger 34 on the spray gun 32 to start the flow, the switch 84 is closed and the stepping switch relay is energized, advancing the stepping switch to either a neutral position where no solenoid is energized or to a position that energizes a solenoid of the valves 43-46 to open one valve and introduce the chemical from the associated container 25-28 into the common conduit 52 and thence to the main conduit 38 where it mixes with fluid from the tank 16. When the flow from the spray gun 32 is stopped and restarted, the stepping switch again advances allowing, e.g., the open solenoid valve to close and opening the next valve in sequence to introduce a different chemical. In one embodiment, the stepping switch has five positions, one for each of the four valves 43-46 and one position where no valve is opened and therefore only fluid from the tank 16 is supplied through the main conduit 38. In another embodiment, the stepping switch is limited to three positions, so that only two of the four valves 43-46 and two of the four containers 25-28 are used in any one operation, for example, in a washing and waxing operation where detergent and wax are used. This eliminates the need to cycle the stepping switch and valve operation through the two unneeded positions corresponding to containers not used in the operation. In such an embodiment, the other two containers carry chemicals for a different operation, such as acid cleaner and alkaline neutralizer for a treating operation. A manual switch, such as a double pole, double throw switch, (not shown) can be used to connect the stepping switch control from one set 43, 44 of two valves and a neutral position, to the other set 45, 46 of two valves and the neutral position.

As an alternative to the electromechanical relay and stepping switch arrangement, a solid state control switching means 82 can be used to sequence the selection of solenoids 80 to operate the valves 43-46. In the solid state embodiment, there is one more solid state relay provided than valves to be operated, to provide a position for supplying liquid from the tank 16 without the addition of any chemical from a container. Solid state relays are known devices (e.g., Guardian Electric solid state unit SLS 103-2A111) that have a signal input to operate the solid state relay and a power input and output to energize the associated solenoid 80. A control signal is applied to one relay and, when applied, prevents power from being transmitted through the relay. When the control signal is removed, power can be transmitted and the so-called relay operated. The control signal is applied from a flow switch, similar to the flow switch 84, but normally closed so that it opens with the initiation of flow through the main conduit 38. When the flow switch opens, the control signal is removed from the solid state relay to be energized, and power is transmitted through the solid state relay to operate the associated solenoid. At the same time, this transmission of power changes the state of the next solid state relay so that it will be activated when the control signal from the flow switch is next removed. This continues through the relays that operate the solenoids and then to a further relay that operates no valve so only fluid from the source 16 is supplied. This further relay is necessary to permit the cycle to continue by changing the state of the first control relay to restart the sequence of valve operation. In this embodiment, it was found that radio noise from the motor generator unit was applying a control signal to the solid state relays, causing unwanted switching. As a result, two capacitors C1, C2 were connected to the electrical leads 85, 86 from the flow control switch to the control switching means 82. As shown in FIG. 4, the capacitor C1, which in the embodiment shown has a value of 0.056 mfd., is connected across the leads 85, 86 and the capacitor C2, which has a value of 0.01 mfd., is connected from the lead 86 to ground.

The operation of the apparatus will be apparent from the above description. An operator will initially set the hand control knobs 66 for the respective valves 43–46 to introduce the proper proportion of chemical from the containers 25–28 to the liquid from the tank 16. Upon actuation of the trigger 34 of the spray gun 32, the control valve 33 will be opened in the spray gun to allow flow of liquid from the tank 16, as pumped by the pump motor unit 18 under positive displacement at high pressure. This flow will actuate the flow switch 84 which will open one of the solenoid-controlled valves 43–46 by raising the appropriate diaphragm valve 76 or will allow flow from the tank 16 without any additive, depending upon where the stepping sequence of the control switching means 82 was previously stopped. Assuming a valve 43–46 is opened, the flow of liquid from the tank 16 through the main conduit 38 and the venturi 54 will reduce the pressure in the common conduit 52, drawing liquid chemical from the container 25–28 associated with the open valve 43–46. The proportion of each chemical to be mixed with the main flow is independently controlled by the needle 64 of each valve 43–46 so the optimum amount of each chemical can be utilized. Upon release of the trigger 34 and closing of the control valve 33, the flow from the tank 16 will stop, allowing the flow switch 84 to return to its previous condition. Upon initiation of flow again through the main conduit by actuation of the trigger 34, the flow switch 84 is again actuated, causing the control switching means 82 to energize the solenoid of the next-to-sequence valve 43–46 or to advance to a position in which no valve 43–46 is operated. In the event the next position to be operated is not consistent with the desired cleaning operation, the operator merely releases the flow control trigger and again depresses it, advancing the control switching means to the next position or more, depending upon the desire of the operator. For convenience, indicator lamps 92, 94 are located on the outside of the vehicle 10 and indicate the position of the stepping switch or the solid state relay activated. In this way, the indicator lamp will show the operator which container is supplying chemical to the main conduit 38. As many indicator lamps are provided as are needed for the operation. For example, where there are four containers 25–28, but only two are used in any one operation, only indicator lamps 92, 94 are required. If all four containers are used in an operation, then four indicator lamps are utilized. No lamp is needed to indicate the condition in which only tank fluid is used.

While preferred embodiments of the invention have been described in detail, various modifications or alterations may be made therein without departing from the spirit and scope of the invention set forth in the appended claims.

I claim:

1. In a mobile washing and treating unit that includes a self propelled vehicle carrying a supply tank of liquid, an electric motor and pump unit for pumping liquid from the tank, a motor-generator unit for supplying electrical power to said electric motor, a plurality of containers for liquid additives to be mixed with liquid pumped from said tank, a venturi injector in a first conduit between said tank and said motor and pump unit, solenoid operated control valves, one associated with an outlet from each of said containers, a second conduit common to said control valves and connected to said venturi injector, and an applicator connected through a flexible hose to the supply tank downstream from the venturi injector for applying liquid from the tank and from said containers to an object being cleaned or treated, the improvement wherein said control valves each include means adjustable for regulating the flow through each valve, means interconnecting each valve to form a common conduit to the venturi injector, a flow-operated switch responsive to initiation of flow from said tank, and control means operated by said flow-operated switch to sequentially operate said control valves, in response to successive operation of said flow-operated switch to introduce fluid from the containers to the flow of fluid in said first conduit.

2. In a method of spray washing or cleaning with a mobile unit, the steps of
   providing a first source of liquid,
   pumping the liquid from the source to an applicator through a flow-operated switch and venturi injector,
   drawing fluid from one of a plurality of reservoirs of liquid by the flow from the first source through the venturi injector,
   introducing the fluid from one of the reservoirs to the flow from the first source,
   individually controlling the proportional amount of liquid flow from any reservoir with respect to the flow from the first source,
   changing the reservoir from which fluid flows in response to initiation of flow from the first source and operation of said flow-operated switch, and
   applying the liquid from both the first source and a reservoir through the applicator under pressure to an object being washed or cleaned.

3. In a mobile washing or cleaning unit, a source of liquid, a main conduit from the source, a fluid pump connected with the main conduit for pumping liquid from the source, a flow control valve for selectively controlling flow through the main conduit and discharge of fluid therefrom, an electrical switch operable in response to changes between conditions of liquid flow and non-flow in the main conduit, a plurality of non-pressurized reservoirs for liquid to be selectively introduced to the main conduit, an aspirator connected with the main conduit and having an inlet at which a pressure lower than that in the main conduit is produced by flow of liquid through the main conduit, a supply conduit common to the reservoirs and connected to the lower pressure inlet of the aspirator, a plurality of conduits connecting the reservoirs to the common supply conduit, a plurality of electrically operable valves, one in each conduit connecting each reservoir to the common supply conduit, an adjustable flow control for each electrically operable valve to control the proportion of fluid supplied from the respective reservoir to the fluid that flows in the main conduit when the associated electrically operable valve is opened, and means for sequentially energizing the electrically operable valves each time the condition of said electrical switch is changed by conditions of both flow and non-flow in the main conduit.

4. A unit as set forth in claim 3 wherein each of said electrically operable valves has a body with a through passage, said adjustable flow control is a manually adjustable needle valve in the body and wherein each body is connected to another at the through passage to form the common supply conduit for the reservoirs.

5. A unit as set forth in claim 4 wherein said electrically operable valve is a solenoid-operable diaphragm valve.

* * * * *